(12) United States Patent
Potoczek

(10) Patent No.: US 7,544,386 B2
(45) Date of Patent: Jun. 9, 2009

(54) METHOD OF MATCHING A COLOR IN A POWDER PAINT SYSTEM INCLUDING METALLIC PIGMENT WITH A COLOR OF A LIQUID PAINT SYSTEM

(75) Inventor: Stephen W. Potoczek, Romulus, MI (US)

(73) Assignee: BASF Corporation, Southfield, MI (US)

( * ) Notice: Subject to any disclaimer, the term of this patent is extended or adjusted under 35 U.S.C. 154(b) by 813 days.

(21) Appl. No.: 11/283,589

(22) Filed: Nov. 18, 2005

(65) Prior Publication Data

US 2007/0116867 A1    May 24, 2007

(51) Int. Cl.
*B05D 1/36* (2006.01)
*B32B 43/00* (2006.01)

(52) U.S. Cl. .................................. 427/203; 427/407.1

(58) Field of Classification Search .................. 427/140, 427/189, 195, 202, 203, 407.1
See application file for complete search history.

(56) References Cited

U.S. PATENT DOCUMENTS

| | | | |
|---|---|---|---|
| 4,960,611 A | 10/1990 | Fujisawa et al. | |
| 4,981,759 A | 1/1991 | Nakatani et al. | |
| 5,379,947 A | 1/1995 | Williams et al. | |
| 5,552,487 A | 9/1996 | Clark et al. | |
| 5,569,539 A | 10/1996 | Avar et al. | |
| 5,601,878 A | 2/1997 | Kranig et al. | |
| 5,639,821 A | 6/1997 | Kraing et al. | |
| 5,879,755 A | 3/1999 | Takahashi et al. | |
| 5,997,941 A | 12/1999 | Dannenhauer et al. | |
| 6,296,899 B1 | 10/2001 | Iizuka | |
| H2006 H | 11/2001 | Ellicks | |
| H002006 H * | 11/2001 | Ellicks | 427/140 |
| 6,331,581 B1 | 12/2001 | Ohnishi et al. | |
| 6,348,520 B1 | 2/2002 | Ohnishi et al. | |
| 6,436,468 B2 | 8/2002 | Iizuka | |
| 6,914,613 B2 | 7/2005 | Marchand et al. | |
| 7,018,682 B1 * | 3/2006 | Rettig et al. | 427/510 |
| 2001/0033892 A1 * | 10/2001 | Iizuka | 427/140 |
| 2003/0163262 A1 | 8/2003 | Corrigan et al. | |

FOREIGN PATENT DOCUMENTS

| | | |
|---|---|---|
| EP | 0892023 A1 | 1/1999 |
| EP | 1561787 A1 | 10/2005 |

OTHER PUBLICATIONS

International Search Report and Written Opinion for PCT/US2006/060416 Filed Nov. 1, 2006.

* cited by examiner

*Primary Examiner*—William Phillip Fletcher, III
(74) *Attorney, Agent, or Firm*—Anne G. Sabourin; Howard & Howard Attorneys PLLC

(57) ABSTRACT

A method of matching a color of a powder paint system including a metallic pigment with a color of a liquid paint system includes applying the liquid paint system onto a substrate. A color effect-providing pigment different than the metallic pigment is added to the liquid paint system to match the color of the powder paint system with the color of the liquid paint system. The color of the liquid paint system including the color effect-providing pigment substantially matches the color of the powder paint system that includes the metallic pigment.

30 Claims, No Drawings

METHOD OF MATCHING A COLOR IN A POWDER PAINT SYSTEM INCLUDING METALLIC PIGMENT WITH A COLOR OF A LIQUID PAINT SYSTEM

BACKGROUND OF THE INVENTION

1. Field of the Invention

The present invention generally relates to a method of matching a color of two regions painted with two different paint systems. More specifically, the subject invention relates to a method of matching a color of a powder paint system with a color of a liquid paint system.

2. Description of the Related Art

Modern vehicles, such as automobiles, are typically offered to consumers in a wide variety of paint colors. In fact, from model year to model year, it is not uncommon for a particular vehicle model to be available in several new paint colors. Different types of paint systems may be used to paint the vehicles. One type of paint system that is used to paint vehicles is a powder paint system.

Powder paint systems are used for certain functional and aesthetic purposes. U.S. Pat. Nos. 5,379,947; 5,552,487; 5,569,539; 5,601,878; and 5,639,821 all disclose various powder paint systems known in the prior art. Powder paint systems have come into favor as providing environmental advantages, such as reduced VOCs over conventional liquid paint systems. As a result, some large vehicle manufacturers favor the use of powder paint systems.

In powder paint systems, a powder paint composition is electrically charged and deposited onto a charged substrate to form a film layer. The film layer is then baked to cure the powder paint composition. It is also known in the art to incorporate conventional pigments, and even conventional effect pigments, specifically metallic pigments, into powder-based coating compositions.

As is often the case, portions of vehicles need to be repainted, often as a result of a defect such as lint, paint scratch, smudge, etc. These defects can be introduced during manufacturing and assembly of the vehicle. Vehicles also need to be repainted after a collision in the refinish industry. Furthermore, many parts suppliers who supply components such as bumpers, mirror housings, moldings, and the like must paint the components prior to delivery of the components to vehicle manufacturers. The facilities and tooling required for using the powder paint systems are relatively costly, as compared to the facilities and tooling required for liquid paint systems. As a result, the liquid paint systems provide the best available option in many situations.

One of the problems that arises for the parts suppliers and those repainting portions of the vehicle with the liquid paint systems is that it is essential to match a color of the vehicle resulting from the powder paint system with a color resulting from the liquid paint composition. Various systems and methods are known in the art that assist in determining a paint formula for the portion that is to be painted or repainted. These systems and methods, however, are not suitable for matching a color of a powder paint system that includes metallic pigment with a color of the liquid paint system. More specifically, liquid and powder paint systems cure differently, and the color of the powder paint system is noticeably different from the color of the liquid paint system when metallic pigment is included in the powder paint system. This is so even if the exact same pigments, in the exact same amounts, are included in the liquid paint system and the powder paint system.

As a result, up to this point, the matching of the color of the powder paint systems that include metallic pigment with the color of the liquid paint systems has been unsatisfactory. As such, there remains an opportunity to provide a method of matching the colors of two vehicle surfaces painted with two different paint systems, namely, a method of matching the color of the powder paint system including metallic pigment with the color of the liquid paint system.

SUMMARY OF THE INVENTION AND ADVANTAGES

The subject invention provides a method of matching a color of a powder paint system including a metallic pigment with a color of a liquid paint system. The method includes the steps of adding a color effect-providing pigment different than the metallic pigment to the liquid paint system to match the color of the powder paint system with the color of the liquid paint system, and applying the liquid paint system onto a substrate to obtain the second color.

The second color of the liquid paint system including the color effect-providing pigment substantially matches the first color of the powder paint system that includes the metallic pigment. To date, nobody has used a pigment in a liquid paint system that is different than the metallic pigment in the powder paint system to effectively match the two paint systems.

DETAILED DESCRIPTION OF THE PREFERRED EMBODIMENT

A method of matching a color of two regions painted with two different paint systems is used primarily in the automotive industry. More specifically, the method is for matching a color of a first region having a powder paint system including a metallic pigment with a color of a second region having a liquid paint system. Although the first region is typically included on a substrate that is formed from metal, such as a vehicle body, the first region may be included on other substrates without varying the scope of the subject invention. By way of example, the first region may be included on a plastic substrate.

The method of matching the colors of the two regions paint with the different paint systems is useful when the vehicle body including the powder paint system is damaged and needs to be repainted, which may be as a result of a collision, paint scratch, etc. For example, the method of the subject invention may be useful for vehicle manufacturers when the vehicle body including the powder paint system is damaged during production. In this situation, the first region and the second region are on the same substrate, and the liquid painting system may be applied to the damaged region of the powder paint system, i.e., the second region. As used herein, "same substrate" refers to the same part, such as a hood, a quarter panel, or door of the vehicle. It is to be appreciated that the second region may be within the first region, for example, as a scratch, i.e., the second region, on the hood including the powder paint system.

Many parts suppliers who supply components such as bumpers, mirror housings, moldings, and the like must paint the components prior to delivery of the components to the vehicle manufacturers. In this situation, the first region including the powder paint composition may be on a sample plate or on the vehicle body. The sample plate may be compared to the component for the vehicle, i.e., the second region, including the liquid paint system. Thus, the first region including the powder paint system may be on the sample or on the vehicle body, and the second region is on a different substrate, i.e., the component, such as the bumper, mirror housing, or molding.

To match the two colors, the powder paint system including the metallic pigment may be applied to the first region. However, it is to be appreciated that the powder paint system may have been previously applied on the first region by another entity, such as a paint manufacturer or the vehicle manufacturer.

Methods of applying powder paint systems are known in the art. More specifically, in the powder paint systems, a powder paint composition is electrically charged and deposited onto a charged substrate, i.e., the vehicle body, to form a powder paint layer. The powder paint composition may be applied to the first region with or without an underlying basecoat layer. After the powder paint layer is formed, the powder paint layer is then baked to cure the powder paint layer.

The powder paint composition typically includes a powder-based binder and the metallic pigment. Metallic pigments are known in the art and widely used in powder paint systems. Metallic pigments, as referred to herein, include pellets or flakes of aluminum, gold, bronze, zinc, stainless steel, copper, and copper alloys including brass and bronze, and combinations thereof. The flakes are commercially available in a range of particle sizes, and the particular particle size varies based on the application. Examples of suitable metallic pigments are commercially available under the trade name Sparkle Silver® from Silberline Manufacturing Co. of Tamaqua, Pa. Preferably, the metallic pigment is aluminum flake. Such metallic pigments are known in the art and are commercially available from a number of manufacturers. The metallic pigment in the powder paint layer, after curing, reflects light to provide a shimmering or sparkling effect.

The powder-based binder is a film-forming binder that includes a resin and a cross-linking agent. The resin includes a functional group, and the cross-linking agent is specifically reactive with the functional group of the resin. More specifically, the resin of the power-based binder may be selected from the group of acrylic resins, epoxy resins, phenolic resins, polyester resins, urethane resins, and combinations thereof. The functional group of the resin may be selected from the group of epoxy functional groups, carboxy functional groups, hydroxy functional groups, and combinations thereof. The cross-linking agent may be selected from the group of aminoplasts, blocked isocyanates, polycarboxylic acids, acid anhydrides, polyamines, and combinations thereof.

In accordance with the subject invention, a match of the color of the powder paint system with the color of the liquid paint system may be achieved by adding a color effect-providing pigment different than the metallic pigment to the liquid paint system, as described in further detail below. More specifically, the liquid paint system including the color effect-providing pigment is applied to the second region to obtain the second color, and as a result of the presence of the color effect-providing pigment in the liquid paint system, the second color substantially matches the powder paint system including the metallic pigment after curing.

The color effect-providing pigment has a pigment substrate and an inorganic coating disposed on the pigment substrate. The pigment substrate has first and second substantially parallel and planar surfaces, and the inorganic coating is disposed or applied on at least one of the first and second substantially parallel and planar surfaces of the pigment substrate. Preferably, the inorganic coating is disposed or applied on both the first and second substantially parallel and planar surfaces. The pigment substrate is preferably a platelet-shaped pigment substrate. As used herein, the terminology platelet-shaped indicates that the pigment substrate is a minute, flattened body. Furthermore, the pigment substrate is preferably selected from the group of metallic pigment substrates, non-metallic pigment substrates, and combinations thereof, depending on the particular color to be matched in the powder paint system.

In an embodiment where the pigment substrate is a metallic pigment substrate, the most preferred metallic pigment substrate is aluminum. Other suitable metallic pigment substrates include, but are not limited to, all metals and alloys in platelet form known as metallic pigment substrates, such as gold, bronze, zinc, stainless steel, copper, and copper alloys including brass and bronze. The aluminum pigment substrate may be a passivated or an unpassivated aluminum pigment substrate.

In an embodiment where the pigment substrate is a non-metallic pigment substrate, the most preferred non-metallic pigment substrate is mica. Other suitable non-metallic pigment substrates include, but are not limited to, borosilicates.

The inorganic coating of the color effect-providing pigment also varies depending on the particular color to be matched in the powder paint system. The inorganic coating may be selected from the group of metal oxides, magnesium fluoride, silicon oxide, silicon oxide hydrate, aluminum oxide, aluminum oxide hydrate, titanium oxide, titanium oxide hydrate, zinc sulfide, magnesium fluoride, and combinations thereof.

Color effect-providing pigments suitable for the subject invention are known in the art and are commercially available from a number of manufacturers. An example of one such color effect-providing pigment having the metallic pigment substrate is Paliocrom® Gold L 2000, commercially available from BASF Corporation of Southfield, Mich. Examples of the color effect providing pigment having the non-metallic pigment substrate include pigments commercially available under the trade name Lumina® from Engelhard Corporation of Iselin, N.J.

The color effect-providing pigment is selected based on the color of the powder paint system. The color effect-providing pigments are generally available in a limited variety of colors, and suitable color effect-providing pigments for purposes of matching the color of the powder paint system need only be in the same color family as the color of the powder paint system. For example, if the color of the powder paint layer system is orange, then an orange or gold color effect-providing pigment may be utilized.

The liquid paint system may include a basecoat layer, a midcoat layer, and a clearcoat layer. As such, the step of applying the liquid paint system may include applying a liquid basecoat composition onto the second region to form the basecoat layer, applying a liquid midcoat composition onto the basecoat layer to form the midcoat layer, and applying a clearcoat composition onto the midcoat layer to form the clearcoat layer. The clearcoat composition may be a liquid or powder-based clearcoat composition. The liquid basecoat, liquid midcoat, and clearcoat compositions may be applied through any conventional application method, such as by spraying, and are preferably applied wet-on-wet. Once each of the layers are formed to complete the liquid paint system, the liquid paint system is typically then cured.

Liquid basecoat compositions are known in the art, and the liquid basecoat composition may be any known liquid basecoat composition that have a specified lightness value and that is capable of hiding the substrate at a film build of no greater than 50 microns. Lightness values of the liquid basecoat composition are described in further detail below. It is to be appreciated that all powder paint systems are different, and the liquid basecoat composition having the specified lightness values may be unique to the powder paint system to be matched. The liquid basecoat composition may be water-borne or solvent-borne, and includes a pigment, a resin, a cross-linking agent, a catalyst, and other additives, all of which are known in the art.

Some commonly used color pigments that may be included in the liquid basecoat composition are copper phthalocyanine-based greens and blues, quinacridone red, iron oxide red, iron oxide yellow, diarylide yellow, perinone orange, indanthrene blue, cromophthal red, irgazine orange, and heliogen green. Preferably, the liquid basecoat composition is substantially free from barites, titanium dioxide, or any other pigments that are known to decrease transparency or increase opacity of the liquid paint system.

As set forth above, the color effect-providing pigment is added to the liquid paint system. More specifically, the color effect-providing pigment is added to the liquid midcoat composition in order to match the color of the powder paint system with the color of the liquid paint system, i.e., the color effect-providing pigment in the midcoat layer mimics the effect of the metallic pigment in the powder paint system. The color effect-providing pigment is typically added to the liquid paint system via a pigment dispersion.

The liquid midcoat composition may be water-borne or solvent-borne. In addition to the color effect-providing pigment, or pigment dispersion, the liquid midcoat composition further includes a midcoat resin, a midcoat cross-linking agent, a catalyst, and, optionally, other additives, all of which are known in the art for including in liquid midcoat compositions. The midcoat resin, midcoat cross-linking agent, catalyst, and other additives may be the same or different from the resin, cross-linking agent, catalyst, and other additives in the liquid basecoat composition.

Preferably, the liquid midcoat composition is formulated to maximize transparency and minimize opacity of the midcoat layer formed from the liquid midcoat composition. As alluded to above, the liquid midcoat composition is preferably free from barites, titanium dioxide, or any other pigments that are known to decrease transparency or increase opacity. Furthermore, the liquid midcoat composition preferably has a pigment-to-binder ratio of from about 0.05 to about 0.06. As a result, the midcoat layer formed from the liquid midcoat composition mimics the effect of the metallic pigment in the powder paint composition without substantially hiding the color from the basecoat layer.

As known in the art, the color of the powder paint system including the metallic effect pigment cannot be easily measured through objective testing with current "multi-angle" spectrophotometers. More specifically, actual color values of the powder paint system at 15°, 25°, 45°, 75°, and 110° viewing angles in Lab color space, as measured with multi-angle spectrophotometers, are often inconsistent for the same powder paint system due to the presence of the metallic pigment. As such, visual comparison is typically used to match the color of the powder paint system with the color of the liquid paint system. To achieve visual matching, many formulations of the liquid paint system may need to be created. In an alternative embodiment, it is to be appreciated that multi-angle spectrophotomers, while not ideal, may be used to measure the color of the powder paint system. An example of a multi-angle spectrophotometer is MA68II Portable Multi-Angle Spectrophotometer commercially available from X-rite of Grandville, Mich. Thus, actual color values of the powder paint system may be determined with such a spectrophotometer at the 15°, 25°, and 110° viewing angles, and the liquid basecoat composition may be formulated accordingly.

As set forth above, the method of the subject invention may include the step of visually comparing the powder paint system to the liquid paint system. There is some consensus within the industry that the human eye can only detect differences in color that are greater than about 6 color units from each other in any of the Lab color values. More specifically, whereas the multi-angle spectrophotometers may detect differences in color on the magnitude of 1 color unit, the human eye can only detect a difference on the magnitude of at least 6 color units. As such, for purposes of the subject invention, "match" or "substantially matching" refers to a difference between the colors of no greater than about 6 color units for the given color value in the Lab color space, with 1 color unit being the differences in color that is measurable with the multi-angle spectrophotometers. If no color value is specified, then "match" or "substantially match" refers to a difference between the colors of no greater than about 6 color units for each of the Lab color values. Preferably, a difference between the colors is no greater than 4 color units in each of the Lab color values.

Preferably, the liquid basecoat composition substantially matches the color of the powder paint system. More specifically, the liquid basecoat composition preferably has a slightly lower documented lightness value at the 110° viewing angle than a lightness value of the powder paint system at the 110° viewing angle. As used herein, "documented lightness value", or any "documented" color value, refers to a color value that is predetermined either through use of the spectrophotometer on another basecoat layer formed from the same liquid basecoat composition, or a color value that is obtained from a manufacturer of the liquid basecoat composition. As described above, actual color values of the powder paint system are often inconsistent, so it may be difficult to determine an appropriate lightness value of the color of the liquid paint system. As such, during initial formulation of the basecoat composition, multiple basecoat compositions may have to be formulated and visual comparison of basecoat layers formed from the basecoat composition may have to be performed until such a match is obtained.

The liquid basecoat composition preferably has a documented lightness value at the 110° viewing angle that is no more than 10% less than the lightness value at the 110° viewing angle of the powder paint system, which contributes to the matching between the color of the powder paint system and the color of the liquid paint system. In addition, the liquid basecoat composition preferably hides black at a film build of no greater than 50 microns in order to minimize the amount of liquid basecoat composition required to hide the substrate or any layers beneath the basecoat layer.

During application of the liquid midcoat composition onto the basecoat layer to form the midcoat layer, the liquid midcoat composition is preferably applied until a color of the midcoat layer substantially matches a lightness value of the powder paint system at the 15° and 25° viewing angles. More specifically, the liquid midcoat composition may be applied while visually comparing the sample including the powder paint system to the liquid paint system, and continuing to apply the liquid midcoat composition until a visual match is achieved between the color of the powder paint system and the color of the liquid paint system. Alternatively, an automated system may be used to apply the liquid midcoat composition based on a predetermined set of application parameters. As described above, the human eye can only detect differences in color that are greater than about 6 color units from each other in any of the Lab color values. Consequently, the liquid midcoat composition is preferably applied until the second color of the liquid paint system has a lightness differential of no greater than about 6 color units from the lightness value of the powder paint system at the 15° and 25° viewing angles. Although the Lab color values cannot be determined when the liquid midcoat layer is still wet, a series of samples may have to be made including the midcoat layer, and the Lab color values determined from the samples after curing the midcoat layer to determine suitable application parameters for obtaining the lightness differential of no greater than about 6 color units from the lightness value of the powder paint system at the 15° and 25° viewing angles. Exact application parameters will vary depending on the colors to be matched, and it is to be appreciated that many liquid midcoat compositions may have to be formulated to obtain such a match.

After the midcoat layer is formed, the clearcoat composition may then be applied onto the midcoat layer to form the clearcoat layer. Such clearcoat compositions, as well as methods of applying the clearcoat compositions, are known in the art.

The following example, as presented herein, is intended to illustrate and not limit the invention.

EXAMPLE

Powder Paint System

A sample is obtained having a powder orange metallic paint system disposed thereon. The sample is used for visual comparison to formulate a liquid basecoat composition and a liquid midcoat composition that substantially matches the color of the powder paint system.

Liquid Paint System

To prepare the liquid paint system, a binder composition is first prepared that is used in a liquid basecoat composition and a liquid midcoat composition. Components included in the binder composition are set forth in Table 2 below, along with relative amounts. All amounts are in parts by weight based on the total weight of the binder composition unless otherwise indicated.

TABLE 2

| Component | Amount, grams | Pbw based on total weight of binder composition |
| --- | --- | --- |
| Resin A | 2080 | 24.84 |
| Resin B | 2000 | 23.89 |
| Cross-linking agent | 1623 | 19.39 |
| UVA | 143 | 1.71 |
| Catalyst B | 149 | 1.78 |
| Solvent A | 134 | 1.60 |
| Solvent B | 228 | 2.72 |
| Solvent C | 403 | 4.81 |
| Solvent D | 152 | 1.82 |
| Solvent E | 223 | 2.66 |
| Additive A | 21 | 0.25 |
| Additive B | 19 | 0.23 |

TABLE 2-continued

| Component | Amount, grams | Pbw based on total weight of binder composition |
| --- | --- | --- |
| Additive C | 627 | 7.49 |
| Additive D | 570 | 6.81 |
| TOTAL | 8372 | 100.00 |

Resin A is a microgel at about 31% NV.
Resin B is a flexible hydroxy-functional acrylic resin at about 73% NV.
Cross-linking agent is Resimene 755 melamine.
UVA is a hydroxyl phenyl benzotriazole based ultraviolet light absorber, sold under the tradename Tinuvin 1130, commercially available from Ciba Specialty Chemicals of Tarrytown, NY.
Catalyst B is Nacure 5225 commercially available from King Industries of Norwalk, CT.
Solvent A is n-methyl pyrrolidone.
Solvent B is denatured ethanol.
Solvent C is butyl acetate.
Solvent D is ethanol.
Solvent E is Exxate ® 600 oxo-alkyl acetic ester commercially available from Exxon Mobil Corporation of Houston, TX.
Additive A is amino methyl propanol.
Additive B is an acrylic additive.
Additive C is a barium sulfate dispersed in high solids acrylic resin.
Additive D is a fumed silica dispresed in high solids acrylic resin.

Next, the binder composition is used to make the midcoat and liquid basecoat compositions. To make the liquid midcoat composition, a color effect-providing pigment is selected based on observation of the powder paint system, and the color effect-providing pigment is mixed into the binder composition. Many liquid midcoat compositions including the color effect-providing pigment are made, and midcoat layers are formed with the liquid midcoat compositions and cured until a midcoat layer is obtained having a lightness value that substantially matches a lightness value of the powder paint system at the 15° and 25° viewing angles. In this example, since the powder orange metallic paint system is to be matched, Paliocrom® Gold L 2000 is a suitable color effect-providing pigment for the liquid midcoat composition. To obtain the substantial match in lightness values between the midcoat layer and the powder paint system, 10 grams of the Paliocrom® Gold L 2000 are then mixed with 600 grams of the binder composition.

To make the liquid basecoat composition, again, many liquid basecoat compositions are made, and basecoat layers are formed from the liquid basecoat compositions and cured until a basecoat layer is obtained having a lightness value that is slightly darker than a lightness value of the powder paint system at the 110° viewing angle. To obtain the desired lightness value of the basecoat layer, 600 grams of the binder composition are mixed together with 263 grams of red black oxide dispersion in high solids acrylic resin, 127 grams of the Paliocrom® Gold L 2000, 105 grams of opaque yellow iron oxide dispersion in high solids acrylic resin, and 875 grams of bismuth vanadate dispersion in high solids acrylic resin.

To apply the liquid paint system, the liquid basecoat composition is first sprayed onto a metallic substrate in an amount sufficient to hide the substrate and to form a basecoat layer. While the basecoat layer is still wet, the liquid midcoat composition is sprayed onto the basecoat layer until a color of the midcoat layer on the basecoat layer visually matches the color of the powder paint system. The binder composition alone, i.e., free of any additive or pigments, is utilized as a liquid clearcoat composition and is sprayed onto the midcoat layer to form a clearcoat layer. The liquid paint system including the basecoat layer, the midcoat layer, and the clearcoat layer is then cured.

The liquid paint system prepared as described above visually matches the powder paint system.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of matching a color of two regions painted with two different paint systems, said method comprising the steps of;
   applying a powder paint system including a metallic pigment to a first region to obtain a first color,
   applying a liquid paint system to a second region to obtain a second color, and
   adding a color effect-providing pigment different than the metallic pigment to the liquid paint system to match the first color with the second color.

2. A method as set forth in claim 1 wherein the color effect-providing pigment has a pigment substrate and an inorganic coating disposed on the pigment substrate.

3. A method as set forth in claim 1 wherein the step of applying the liquid paint system further comprises applying a liquid basecoat composition onto the second region to form a basecoat layer.

4. A method as set forth in claim 3 wherein the step of applying the liquid paint system further comprises applying a liquid midcoat composition onto the basecoat layer to form a midcoat layer.

5. A method as set forth in claim 4 wherein the step of applying the liquid paint system further comprises applying a clearcoat composition onto the midcoat layer to form a clearcoat layer.

6. A method as set forth in claim 4 wherein the step of adding the color effect-providing pigment to the liquid paint system comprises adding the color effect-providing pigment to the liquid midcoat composition.

7. A method as set forth in claim 6 wherein the liquid midcoat composition further comprises a midcoat resin, a midcoat cross-linking agent, and a catalyst.

8. A method as set forth in claim 7 wherein the liquid midcoat composition has a pigment-to-binder ratio of from about 0.05 to about 0.06.

9. A method as set forth in claim 7 wherein the liquid midcoat composition is substantially free of barites and titanium dioxide.

10. A method as set forth in claim 4 wherein said step of applying the liquid midcoat composition is further defined as applying the liquid midcoat composition until a color of the midcoat layer substantially matches a lightness value of the powder paint system at the 15° and 25° viewing angles.

11. A method as set forth in claim 10 wherein the midcoat layer has a lightness differential of no greater than about 6 color units in Lab color space from the lightness value of the powder paint system at the 15° and 25° viewing angles.

12. A method as set forth in claim 11 wherein the liquid basecoat composition has a lower documented lightness value at the 110° viewing angle than a lightness value of the powder paint system at the 110° viewing angle.

13. A method as set forth in claim 12 wherein the liquid basecoat composition has a documented lightness value at the 110° viewing angle that is no more than 10% less than the lightness value at the 110° viewing angle of the powder paint system.

14. A method as set forth in claim 10 wherein the liquid basecoat composition hides black at a film build of no greater than 50 microns.

15. A method as set forth in claim 14 wherein the liquid basecoat composition is substantially free of barites and titanium dioxide.

16. A method as set forth in claim 10 further comprising the step of determining actual color values of the powder paint system with a spectrophotometer at the 15°, 25°, and 110° viewing angles.

17. A method as set forth in claim 1 wherein the first region and the second region are included on the same substrate.

18. A method as set forth in claim 1 wherein the first region and the second region are included on different substrates.

19. A method of matching a color of a powder paint system including a metallic pigment with a color of a liquid paint system, said method comprising the steps of;
   applying a liquid basecoat composition onto a substrate to form a basecoat layer,
   applying a liquid midcoat composition onto the basecoat layer to form a midcoat layer,
   adding a color effect-providing pigment different than the metallic pigment to the liquid midcoat composition to match the color of the powder paint system; and
   applying a clearcoat composition onto the midcoat layer to form a clearcoat layer.

20. A method as set forth in claim 19 wherein the color effect-providing pigment has a pigment substrate and an inorganic coating disposed on the pigment substrate.

21. A method as set forth in claim 19 wherein the liquid midcoat composition further comprises a binder.

22. A method as set forth in claim 21 wherein the liquid midcoat composition has a pigment-to-binder ratio of from about 0.05 to about 0.06.

23. A method as set forth in claim 21 wherein the liquid midcoat composition is substantially free of barites and titanium dioxide.

24. A method as set forth in claim 19 wherein said step of applying the liquid midcoat composition is further defined as applying the liquid midcoat composition until a color of the midcoat layer substantially matches a lightness value of the powder paint system at the 15° and 25° viewing angles.

25. A method as set forth in claim 24 wherein the midcoat layer has a lightness differential of no greater than about 6 color units from a lightness value of the powder paint system at the 15° and 25° viewing angles.

26. A method as set forth in claim 25 wherein the liquid basecoat composition has a lower documented lightness value at the 110° viewing angle than a lightness value at the 110° viewing angle of the powder paint system.

27. A method as set forth in claim 26 wherein the liquid basecoat composition has a documented lightness value at the 110° viewing angle that is no more than 10% less than the lightness value at the 110° viewing angle of the powder paint system.

28. A method as set forth in claim 19 further comprising the step of determining actual color values of the powder paint system with a spectrophotometer at the 15°, 25°, and 110° viewing angles.

29. A method as set forth in claim 19 wherein the liquid basecoat composition hides black at a film build of no greater than 50 microns.

30. A method as set forth in claim 29 wherein the liquid basecoat composition is substantially free of barites and titanium dioxide.

* * * * *